United States Patent
Taras et al.

(10) Patent No.: US 10,830,542 B2
(45) Date of Patent: Nov. 10, 2020

(54) METHOD FOR MANUFACTURING A MULTIPLE MANIFOLD ASSEMBLY HAVING INTERNAL COMMUNICATION PORTS

(71) Applicant: Carrier Corporation, Farmington, CT (US)

(72) Inventors: Michael F. Taras, Fayetteville, NY (US); Bruce J. Poplawski, Mattydale, NY (US); Arindom Joardar, Jamesville, NY (US); Jack Leon Esformes, Jamesville, NY (US); Tobias H. Sienel, Baldwinsville, NY (US); Mel Woldesemayat, Liverpool, NY (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 1167 days.

(21) Appl. No.: 14/890,236

(22) PCT Filed: May 12, 2014

(86) PCT No.: PCT/US2014/037633
§ 371 (c)(1),
(2) Date: Nov. 10, 2015

(87) PCT Pub. No.: WO2014/186251
PCT Pub. Date: Nov. 20, 2014

(65) Prior Publication Data
US 2016/0116230 A1    Apr. 28, 2016

Related U.S. Application Data

(60) Provisional application No. 61/823,591, filed on May 15, 2013.

(51) Int. Cl.
*F28D 1/053*     (2006.01)
*B23P 15/26*     (2006.01)
*F28F 9/02*      (2006.01)

(52) U.S. Cl.
CPC ............. *F28F 9/02* (2013.01); *B23P 15/26* (2013.01); *F28D 1/05391* (2013.01); *F28F 9/0243* (2013.01)

(58) Field of Classification Search
CPC . F28F 9/02; F28F 9/0243; B23P 15/26; F28D 1/05391; B21D 28/28; Y10T 29/4935
See application file for complete search history.

(56) References Cited

U.S. PATENT DOCUMENTS

| | | |
|---|---|---|
| 5,348,081 A | 9/1994 | Halstead et al. |
| 5,666,840 A | 9/1997 | Shah et al. |

(Continued)

FOREIGN PATENT DOCUMENTS

| | | |
|---|---|---|
| CN | 2769823 Y | 4/2006 |
| CN | 201129963 Y | 10/2008 |

(Continued)

OTHER PUBLICATIONS

Chinese Office Action and Search Report for CN 201480027672.X, dated Jun. 30, 2017, 10pgs.

(Continued)

*Primary Examiner* — Lee A Holly
(74) *Attorney, Agent, or Firm* — Cantor Colburn LLP

(57) ABSTRACT

A method is provided for manufacturing a manifold assembly with internal fluid communication between a first manifold defining a first fluid chamber and a second manifold defining a second fluid chamber of the manifold assembly, the first manifold and the second manifold joined in parallel relationship along a longitudinally extending interface between a wall of the first manifold and a wall of the second manifold. The method includes: forming a first access port in a wall of one of the first manifold and the second manifold diametrically opposite the interface; forming a first fluid communication port extending through a wall of the first (Continued)

manifold and a wall of the second manifold at the interface and defining a first fluid passage between the first and second fluid chambers; and sealingly plugging the access port.

19 Claims, 6 Drawing Sheets

(56) References Cited

U.S. PATENT DOCUMENTS

| | | | |
|---|---|---|---|
| RE35,725 E | | 2/1998 | Briesacher et al. |
| 6,718,860 B2 | | 4/2004 | Mitsukawa et al. |
| 7,460,369 B1 | | 12/2008 | Blish, II |
| 7,895,860 B2 | | 3/2011 | Tucker et al. |
| 7,921,558 B2 | | 4/2011 | Beamer et al. |
| 7,946,036 B2 | | 5/2011 | Beamer et al. |
| 2007/0261684 A1 | * | 11/2007 | Hazelton .............. F01M 13/023 123/572 |
| 2008/0023184 A1 | * | 1/2008 | Beamer ................ F28F 9/0224 165/174 |
| 2010/0270012 A1 | | 10/2010 | Hur et al. |
| 2010/0300667 A1 | | 12/2010 | Samuelson |
| 2011/0088885 A1 | | 4/2011 | Samuelson et al. |
| 2011/0174472 A1 | * | 7/2011 | Kurochkin .......... F28D 1/05391 165/174 |
| 2011/0288512 A1 | * | 11/2011 | Locke ................. A61M 1/0066 604/319 |
| 2012/0234036 A1 | | 9/2012 | Yanik |
| 2013/0220562 A1 | * | 8/2013 | Jenkins ................ H05K 7/1495 160/368.1 |

FOREIGN PATENT DOCUMENTS

| | | | | |
|---|---|---|---|---|
| CN | 201885609 U | | 6/2011 | |
| EP | 1657513 A1 | | 5/2006 | |
| EP | 1657513 B1 | * | 1/2008 | ......... F28D 1/05391 |
| JP | 2001174191 A | | 6/2001 | |
| JP | 2006159285 A | | 6/2006 | |
| WO | 9835178 A1 | | 8/1998 | |
| WO | 2007037670 A1 | | 4/2007 | |
| WO | 2012071196 A2 | | 11/2011 | |
| WO | 2013058953 A1 | | 4/2013 | |

OTHER PUBLICATIONS

International Search Report for application PCT/US2014/037633, dated Sep. 24, 2014, 5 pages.
Written Opinion for application PCT/US2014/037633, dated Sep. 24, 2014, 4 pages.
Chinese Office Action for CN 201480027672.X, dated Feb. 28, 2017, 7pgs.

* cited by examiner

METHOD FOR MANUFACTURING A MULTIPLE MANIFOLD ASSEMBLY HAVING INTERNAL COMMUNICATION PORTS

BACKGROUND OF THE INVENTION

This invention relates generally to multiple tube bank heat exchangers and, more particularly, to the manufacture of a multiple manifold assembly having internal communication ports between manifolds.

Heat exchangers have long been used as evaporators and condensers in heating, ventilating, air conditioning and refrigeration (HVACR) applications. Historically, these heat exchangers have been round tube and plate fin (RTPF) heat exchangers. However, all aluminum flattened tube serpentine fin heat exchangers are finding increasingly wider use in industry, including the HVACR industry, due to their compactness, thermal-hydraulic performance, structural rigidity, lower weight and reduced refrigerant charge, in comparison to conventional RTPF heat exchangers. Flattened tubes commonly used in HVACR applications typically have an interior subdivided into a plurality of parallel flow channels. Such flattened tubes are commonly referred to in the art as multi-channel tubes, mini-channel tubes or micro-channel tubes.

A typical flattened tube serpentine fin heat exchanger includes a first manifold, a second manifold, and a single tube bank formed of a plurality of longitudinally extending flattened heat exchange tubes disposed in spaced parallel relationship and extending between the first manifold and the second manifold. The first manifold, second manifold and tube bank assembly is commonly referred to in the heat exchanger art as a slab. Additionally, a plurality of fins are disposed between the neighboring pairs of heat exchange tubes for increasing heat transfer between a fluid, commonly air in HVACR applications, flowing over the outside surface of the flattened tubes and along the fin surfaces and a fluid, commonly refrigerant in HVACR applications, flowing inside the flattened tubes. Such single tube bank heat exchangers, also known as single slab heat exchangers, have a pure cross-flow configuration.

Double bank flattened tube and serpentine fin heat exchangers are also known in the art. Conventional double bank flattened tube and serpentine fin heat exchangers are typically formed of two conventional fin and tube slabs, one spaced behind the other, with fluid communication between the manifolds accomplished through external U-bends or interconnecting piping. To connect the two slabs in fluid flow communication in other than a parallel cross-flow arrangement requires complex external piping. For example, U.S. Pat. No. 6,964,296 B2 and U.S. Patent Application Publication 2009/0025914 A1 disclose embodiments of double bank, multichannel flattened tube heat exchanger.

SUMMARY OF THE INVENTION

In an aspect, a method is provided for manufacturing a manifold assembly with internal fluid communication between a first manifold defining a first fluid chamber and a second manifold defining a second fluid chamber of the manifold assembly, the first manifold and the second manifold joined in parallel relationship along a longitudinally extending interface between a wall of the first manifold and a wall of the second manifold. The method includes: forming a first access port in a wall of one of the first manifold and the second manifold diametrically opposite the interface; forming a first fluid communication port extending through a wall of the first manifold and a wall of the second manifold at the interface and defining a first fluid passage between the first and second fluid chambers; and sealingly plugging the access port.

The method may further include: forming at least one additional access port spaced longitudinally from the first access port; forming at least one additional fluid communication port extending through the wall of the first manifold and the wall of the second manifold, at the interface and defining an additional fluid passage between the first and second fluid chambers spaced longitudinally from the first fluid passage; and sealingly plugging the at least one additional access port.

The method may further include forming the manifold assembly as an integral manifold assembly by an extrusion process.

The method may include forming the access port and fluid communication port by a drilling operation. The method may include first forming the access port by a punching operation and thereafter forming the fluid communication port by a drilling operation. The method may include first forming the access port by a first punching operation and thereafter forming the fluid communication port by a second punching operation.

Sealingly plugging the access port may comprise inserting a plug in the access port in a force fit relationship with the manifold in which the first hole is formed and brazing the inserted plug to the manifold in which the access port is formed. The inserted plug comprises an end cap and a shaft extending from the end cap into the access port and the end cap abutting an external surface of the manifold in which the access port is formed. The method may include brazing the end cap to the external surface of the manifold in which the access port is formed.

BRIEF DESCRIPTION OF THE DRAWINGS

For further understanding of the disclosure, reference will be made to the following detailed description which is to be read in connection with the accompanying drawing, where.

DETAILED DESCRIPTION

Figure 1:
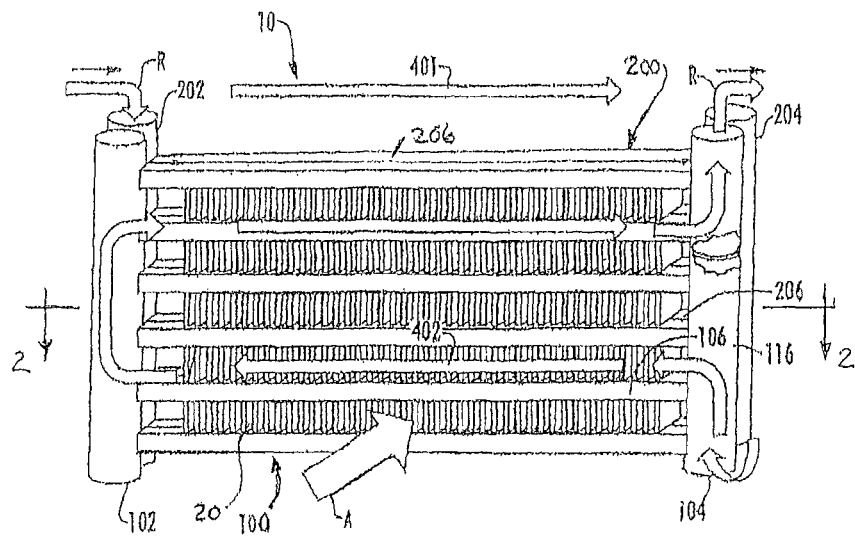
FIG. 1 is a diagrammatic illustration of an embodiment of a multiple tube bank, flattened tube finned heat exchanger.

An exemplary embodiment of a multiple bank flattened tube finned heat exchanger unit, generally designated 10, is depicted in perspective illustration in FIG. 1. As depicted therein, the multiple bank flattened tube finned heat exchanger 10 includes a first tube bank 100 and a second tube bank 200 that is disposed behind the first tube bank 100, that is downstream with respect to air flow, A, through the heat exchanger. The first tube bank 100 may also be referred to herein as the front heat exchanger slab 100 and the second tube bank 200 may also be referred to herein as the rear heat exchanger slab 200.

The first tube bank 100 includes a first manifold 102, a second manifold 104 spaced apart from the first manifold 102, and a plurality of heat exchange tube segments 106, including at least a first and a second tube segment, extending longitudinally in spaced parallel relationship between and connecting the first manifold 102 and the second manifold 104 in fluid communication. The second tube bank 200 includes a first manifold 202, a second manifold 204 spaced apart from the first manifold 202, and a plurality of heat exchange tube segments 206, including at least a first and a second tube segment, extending longitudinally in spaced parallel relationship between and connecting the first manifold 202 and the second manifold 204 in fluid communication. Each tube bank 100, 200 may further include "dummy" guard tubes extending between its first and second manifolds at the top of the tube bank and at the bottom of the tube bank. These "dummy" guard tubes do not convey refrigerant flow, but add structural support to the tube bank and protect the uppermost and lowermost fins.

Figure 2:
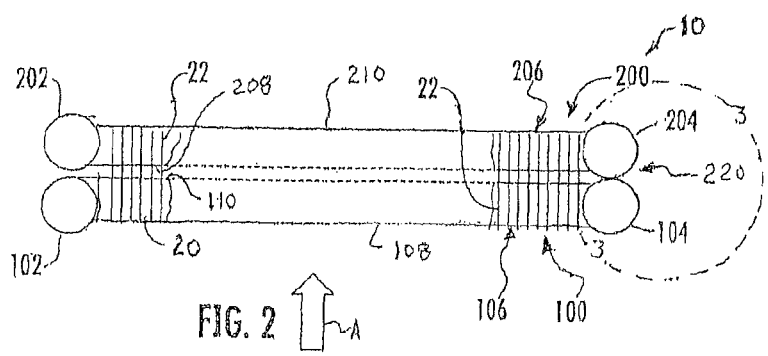
FIG. 2 is a diagrammatic plan view taken along line 2-2 of FIG. 1.

Referring now to FIG. 2 also, each of the heat exchange tube segments 106, 206 comprises a flattened heat exchange tube having a leading edge 108, 208, a trailing edge 110, 210, an upper surface and a lower surface. The leading edge 108, 208 of each heat exchange tube segment 106, 206 is upstream of its respective trailing edge 110, 210 with respect to airflow through the heat exchanger 10. The interior flow passage of each of the heat exchange tube segments 106, 206 of the first and second tube banks 100, 200, respectively, may be divided by interior walls into a plurality of discrete flow channels that extend longitudinally the length of the tube from an inlet end of the tube to an outlet end of the tube and establish fluid communication between the respective fluid chambers of the manifolds 102, 104 of the first tube bank 100 and respective fluid chambers of the manifolds 202, 204 of the second tube bank 200.

Referring again in particular to FIG. 1, the flattened tube finned heat exchanger 10 may further include a plurality of folded fins 20. Each folded fin 20 is formed of a single continuous strip of fin material tightly folded in a ribbon-like serpentine fashion thereby providing a plurality of closely spaced fins that extend generally orthogonal to the flattened heat exchange tubes 106, 206. Heat exchange between the refrigerant flow, R, and air flow, A, occurs through the outside surfaces of the heat exchange tube segments 106, 206 and also through the heat exchange surface of the fins of the folded fin 20. In the depicted embodiment, the depth of each of the ribbon-like folded fin 20 extends at least from the leading edge 108 of the first tube bank 100 to the trailing edge of 210 of the second bank 200.

The multiple bank, flattened tube heat exchange unit 10 disclosed herein is depicted in a cross-counterflow arrangement wherein refrigerant (labeled "R") from a refrigerant circuit (not shown) of a refrigerant vapor compression system (not shown) passes through the manifolds and heat exchange tube segments of the tube banks 100, 200, in a manner to be described in further detail hereinafter, in heat exchange relationship with a cooling media, most commonly ambient air, flowing through the airside of the heat exchanger 10 in the direction indicated by the arrow labeled "A" that passes over the outside surfaces of the heat exchange tube segments 106, 206 and the surfaces of the fins 22 of the folded fins 20. The air flow first passes transversely across the upper and lower horizontal surfaces of the heat exchange tube segments 106 of the first tube bank, and then passes transversely across the upper and lower horizontal surfaces of the heat exchange tube segments 206 of the second tube bank 200. The refrigerant passes in cross-counterflow arrangement to the airflow, in that the refrigerant flow passes first through the second tube bank 200 and then through the first tube bank 100. The multiple tube bank, flattened tube finned heat exchanger 10 having a cross-counterflow circuit arrangement yields superior heat exchange performance, as compared to the crossflow or cross-parallel flow circuit arrangements, as well as allows for flexibility to manage the refrigerant side pressure drop via implementation of tubes of various widths within the first tube bank 100 and the second tube bank 200.

The second manifolds 104 and 204 are longitudinally elongated, tubular manifolds disposed in side-by-by side parallel relationship and connected together along a longitudinally extending interface by a web extending between the outer walls of the parallel second manifolds to form a multiple barrel (i.e. multiple assembly) manifold assembly 220. Depending upon the desired spacing, if any, to be provided, the parallel manifolds 104 and 204 may be disposed with their respective outer walls abutting or with their respective outer walls in spaced relationship. In an embodiment, the manifold assembly 220 may be formed as an integral one-piece unit by an extrusion process. In an embodiment, the manifold assembly 220 may be fabricated by bonding two or more manifolds together, for example, by welding or brazing, with the weld or braze joint forming the connecting web.

Figure 3:
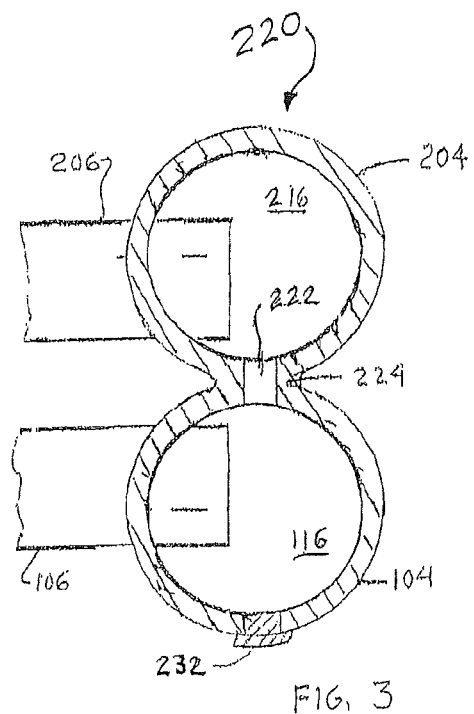
FIG. 3 is a sectioned plan view of the tube to manifold connection region 3-3 of FIG. 2.

Referring now to FIG. 3, the neighboring second manifolds 104 and 204 of the depicted dual barrel manifold assembly 220 are connected in fluid flow communication by at least one fluid flow passage 222 such that refrigerant may flow from the interior fluid chamber 216 of the second manifold 204 of the second tube bank 200 into the interior fluid chamber 116 of the second manifold 104 of the first tube bank 100. Typically, a plurality of fluid flow passages 222 are provided between the second manifolds 104 and 204 at longitudinally space intervals. It is understood, however, that manifolds 104 and 204 may have multiple internal chambers (depending on a number of refrigerant passes), and only some of the adjacent chambers may need to be connected by the internal fluid flow passages 222 to form the cross-counterflow configuration between refrigerant flowing inside the tubes 106 and 206 and air flowing outside of those tubes.

The specific number of fluid flow passages 222, the size of the flow area of the individual fluid flow passages 222, and the longitudinal spacing between adjacent fluid flow passages 222 may be selected on a case-by-case basis taking into consideration the size of the manifolds, refrigerant flow volume and pressure drop requirements, and structural considerations. By way of example for purposes of illustration, for a manifold assembly with tubular manifolds having an internal diameter in the range of 15 to 25 millimeters, the fluid flow passages between manifolds would typically have an internal diameter in the range of 2 to 4 millimeters and be spaced longitudinally at intervals ranging from 20 to 50 millimeters.

Figure 4A:
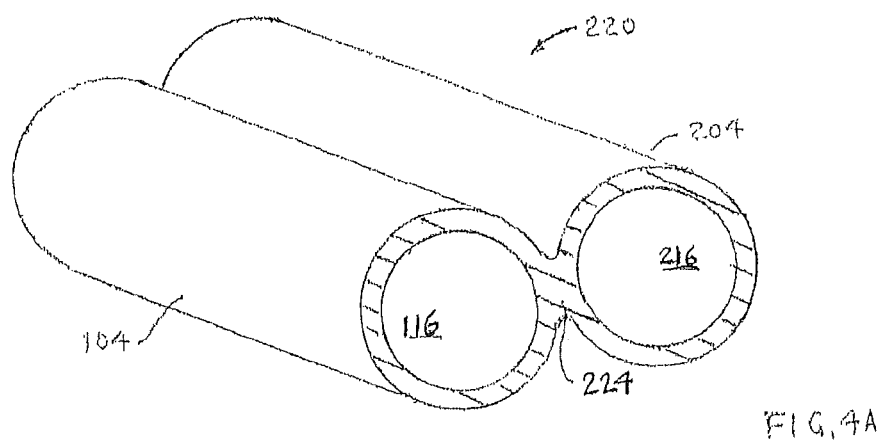
FIGS. 4A-4D are perspective views, in section, illustrating a method of forming manifold-to-manifold fluid flow passages in the dual-barrel embodiment of the integral manifold assembly of FIG. 3.

The process disclosed herein provides a method for manufacturing a multiple manifold assembly, such as the dual barrel manifold assembly 220, with internal fluid communication between the first manifold 104 defining a first fluid chamber 116 and the second manifold 204 defining a second fluid chamber 216 of the manifold assembly. Referring now to FIGS. 4A-4D, the method includes forming the manifold assembly 220 with the first manifold 104 and the second manifold 204 joined in parallel relationship along a longitudinally extending interface by a web 224 between an outer wall of the first manifold 104 and an outer wall of the second manifold 204, such as illustrated in FIG. 4A. In the embodiment depicted in FIG. 4A, the manifold assembly 220 has been formed by an extrusion process wherein a metal blank, such as for example, but not limited to, an aluminum alloy blank, into the integral single piece dual barrel tubular manifold assembly 220. The extruded manifold assembly 220 includes a first tubular barrel forming the first manifold 104, a second tubular barrel forming the second manifold 204, and a web 224 joining the tubular barrels along the longitudinal extent of the manifold assembly.

Figure 4B:
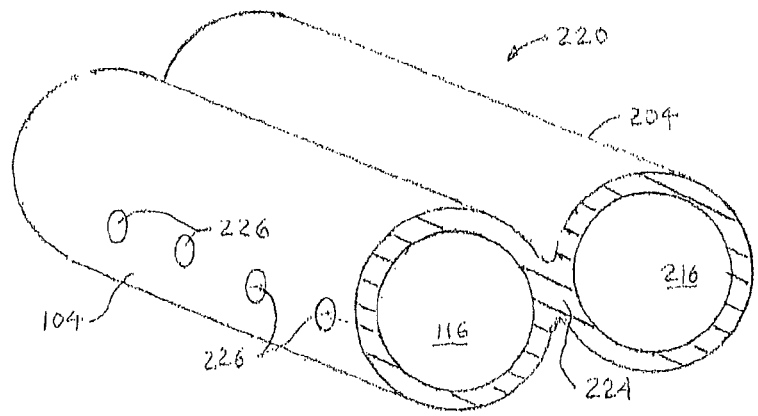
Figure 4C:
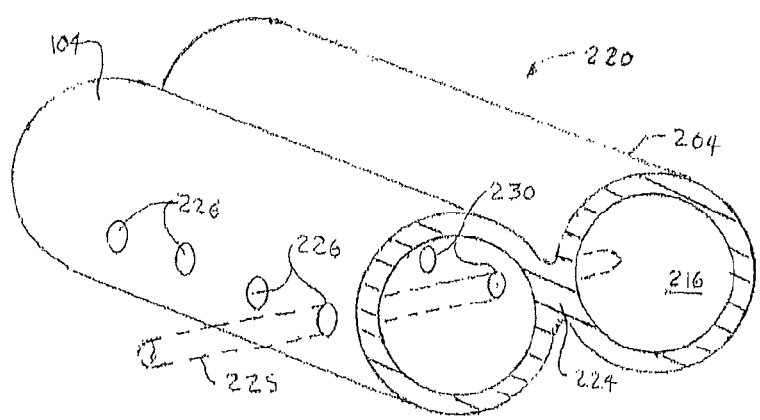

The method further includes forming at least a first access port 226 in a wall of one of the first manifold 104 and the second manifold 204 diametrically opposite the interface, for example in the first manifold 104 as illustrated in FIG. 4B, and then forming a first fluid communication port 230, aligned with the first access port 226, that extends through a wall of the first manifold 104 and a wall of the second manifold 204 at the interface and the web 224 therebetween, as illustrated in FIG. 4C. If an additional fluid communication port 230 is required, an additional access port 226 is formed in the manifold 104 longitudinally spaced from the first access port 226 to provide access for forming an additional fluid communication port 230 longitudinally spaced from the first communications hole 230. If further fluid communication ports 230 are required, the process is repeated with an additional access ports 226 being formed in the first manifold 104 at longitudinally spaced intervals for each fluid communication port 230. It is to be understood however that the multiple access ports 226 can be formed simultaneously. Likewise, the multiple communication ports 230 can be formed at the same time.

Each access port 226 provides access to the interior chamber 116 of the first manifold so that a hole forming tool 225, shown in phantom lines in FIG. 4C, can form the fluid communication port 230 extending through the wall of the first manifold 104, the web 224 and the second manifold 204 into the interior chamber 216 of the second manifold 204. Each fluid communication port 230 defines a fluid passage 222 extending between the first and second fluid chambers, 116, 216. Each access port 226 and corresponding aligned fluid communication port 230 may be formed in a continuous operation using a single hole forming tool. Or each access port 226 and corresponding aligned fluid communication port 230 may be formed using a two-step operation wherein the access port 226 is formed with a first hole forming tool and then a second hole forming tool is inserted through the access port 226 for forming the fluid communication port 230.

If the port to be formed has a circular cross-section, the port may be formed through a drilling operation with the port formation tool being a drill. However, if the hole to be formed has a non-circular cross-section, the hole may be formed through a punching operation with the port formation tool being a punch tool. In an embodiment, the method includes first forming the access port by a first drilling operation and thereafter forming the fluid communication port by a second drilling operation. In an embodiment, the method includes first forming the access port by a punching operation and thereafter forming the fluid communication port by a drilling operation. In an embodiment, the method includes first forming the access port by a first punching operation and thereafter forming the fluid communication port by a second punching operation. It has to be understood that a deburring operation may be required, in case the drilling tool does not have such design feature. Furthermore, the punching tool may be used for the circular hole formation for the manufacturing efficiency.

Figure 4D:
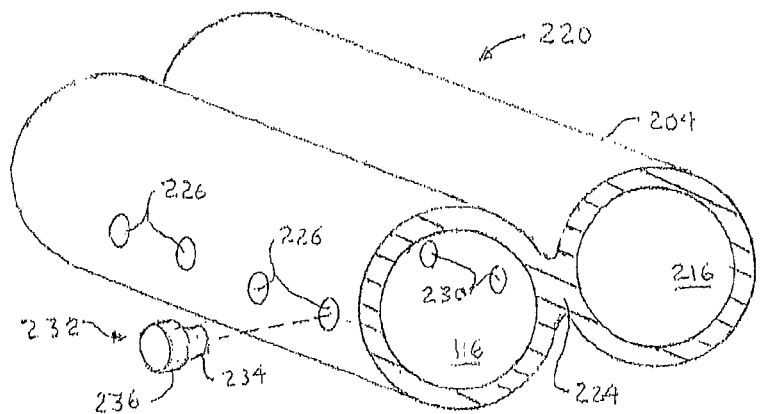

The method further includes sealingly plugging each of the access ports 226. As illustrated in FIG. 4D, to sealingly plug an access port 226, a plug 232 is inserted into the access port 226 and subsequently metallurgically bonded to the manifold during the brazing of the heat exchanger assembly in a brazing furnace, for example a controlled atmosphere furnace. The plug 232 has a shaft 234 having a cross-sectional shape conforming to the cross-sectional shape of the bore of the access port 226 and sized to be in a force fit relationship with the bore of the access port 226. Additionally, the length of the shaft 234 of the plug 232 may approximate the thickness of the wall of the manifold such that that end of the shaft 234 is substantially flush with the inside wall of the manifold, whereby a flow disturbance is not created by the shaft 234 of the plug 232 extending too deeply into the interior chamber of the manifold. The plug 232 may further include an end cap 236 mounted to an end of the shaft 234, the end cap 236 having a cross-sectional dimension, e.g. diameter for a circular end cap, that is greater then a corresponding cross-sectional dimension, e.g. diameter for a circular bore access port, of the plug shaft 234. The end cap may be configured to abut against the outer surface of the manifold when the plug 232 is fully inserted into the access port 226 and will provide an additional control of the insertion depth for the plug 232.

Figure 5A:
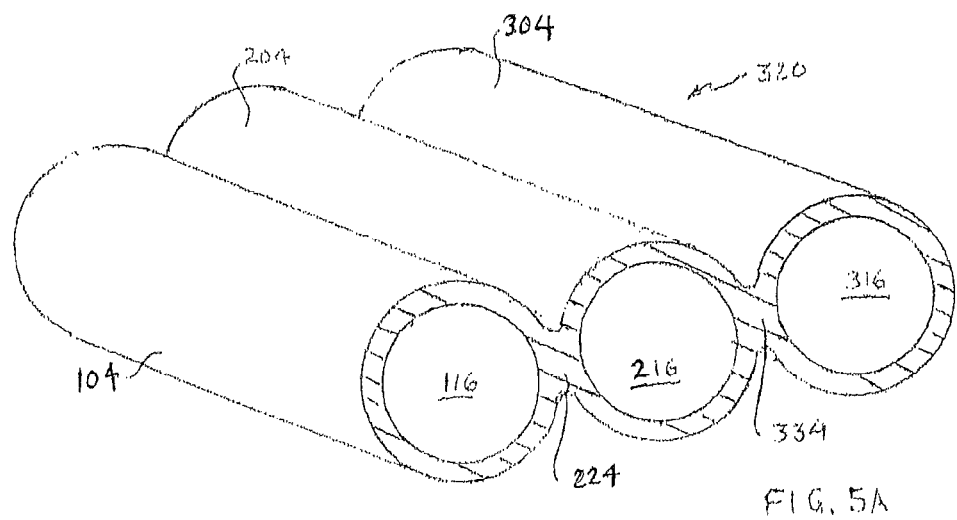
FIGS. 5A-5D are cross-sectional views of an extruded triple barrel embodiment of an integral manifold assembly illustrating a method of forming manifold-to-manifold fluid flow passages therein.

The method disclosed herein may also be applied to multiple barrel manifold assemblies having more than two manifolds. For example, referring to FIG. 5A, the method disclosed herein may be applied to an integral extruded triple barrel manifold assembly 320 to form fluid flow passages between the interior fluid chambers 116, 216, respectively, of the first and second manifolds 104, 204 and to form fluid flow passages between the interior fluid chambers 216, 316, respectively, of the second and third manifolds 204, 304.

Figure 5B:
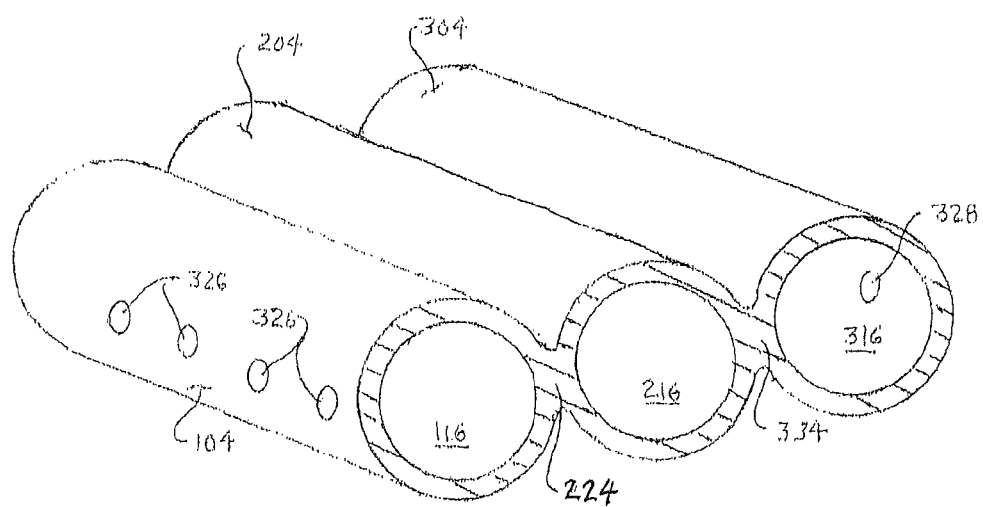
Figure 5C:
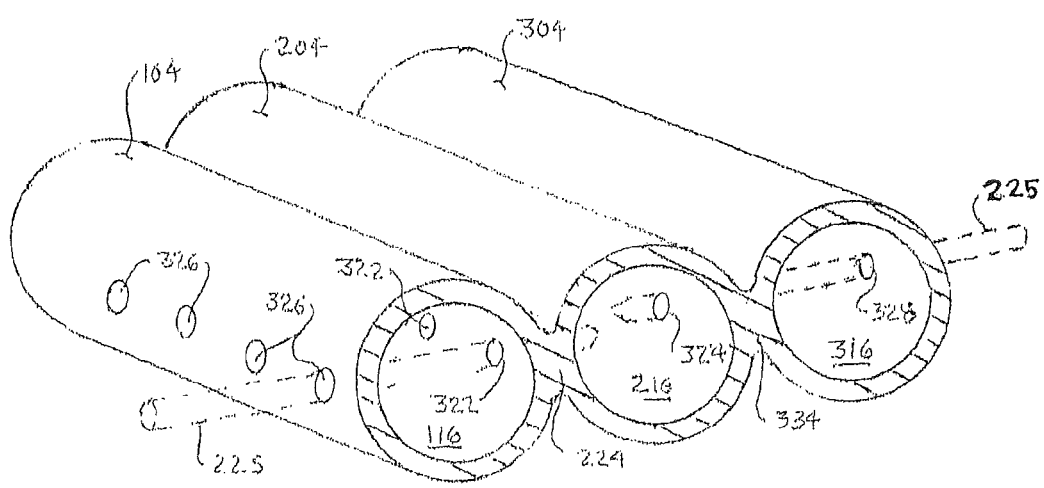

Referring to FIGS. 5B and 5C, the method includes forming at least one access port 326 in a wall of the first manifold 104 and forming at least one access port 328 in a wall of the third manifold 304, for example as illustrated in FIG. 5B, and then forming a fluid communication port 322, aligned with the access port 326, that extends through a wall of the first manifold 104 and a wall of the second manifold 204 and the web 224 therebetween, as illustrated in FIG. 5C, and also forming a fluid communication port 324, aligned with the access port 328, that extends through a wall of the third manifold 304 and a wall of the second manifold 204 and the web 334 therebetween, as also illustrated in FIG. 5C. If additional fluid communication ports 322 are required, additional access ports 326 may be formed in the first manifold 104 at longitudinally spaced intervals from the first access port 326 to provide access for forming additional fluid communication ports 322 between the fluid chambers 116 and 216. If additional fluid communication ports 324 are required, additional access ports 328 may be formed in the third manifold 304 at longitudinally spaced intervals from the first access port 328 to provide access for forming additional fluid communication ports 324 between the fluid chambers 216 and 316.

Each access port 326 provides access to the interior chamber 116 of the first manifold 104 so that a hole forming tool 225, shown in phantom lines in FIG. 5C, may be inserted to form a fluid communication port 322 extending through the wall of the first manifold 104, the web 224 and the second manifold 204 into the interior chamber 216 of the second manifold 204. Each fluid communication port 322 defines a fluid passage extending between the first and second fluid chambers, 116, 216. Each access port 328 provides access to the interior chamber 316 of the third manifold 304 so that a hole forming tool 225, shown in phantom lines in FIG. 5C, may inserted to form a fluid communication port 324 extending through the wall of the third manifold 304, the web 334 and the second manifold 204 into the interior chamber 216 of the second manifold 204. Each fluid communication port 324 defines a fluid passage extending between the third and second fluid chambers, 316, 216. The fluid communication ports 322 and 324 may be formed in longitudinally staggered arrangement relative to each other, whereby the fluid flow passages between the second and third manifolds 204, 304 are offset from, rather than aligned with, the fluid flow passages between the first and second manifolds 104, 204. Additionally, if the communication ports 322 connecting the first and second manifolds 104, 204 and the respective communication ports 324 connecting the second and third manifolds 204, 304 are aligned, the aligned communication ports can be formed by the port formation tool penetrating the outside wall of one of the manifolds 104 or 304.

Figure 6:
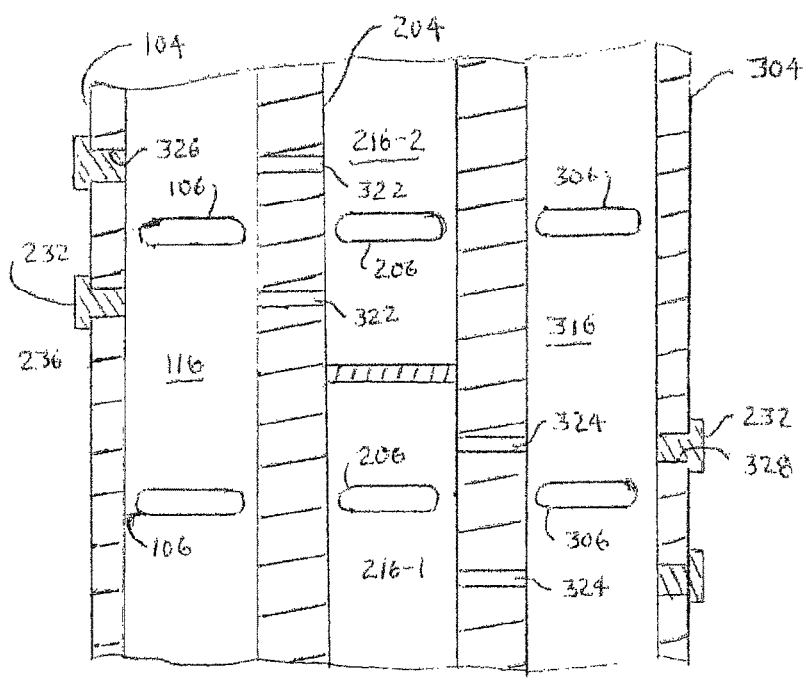
FIG. 6 is a sectioned side elevation view of another embodiment of a triple barrel integral manifold assembly.

Furthermore, the communication ports 322 and 324 connecting the manifolds 104, 204 and 304, 204 respectively may be formed in different longitudinal positions to connect different interior chambers 216 within the manifold 204 to the interior chambers 116 and 316 within the manifolds 104 and 304 respectively. For example, as illustrated in FIG. 6, wherein the interior chamber of second manifold 204 is subdivided by an internal wall 205 into a lower chamber 216-1 and an upper chamber 216-2, the communication ports 324 may be positioned longitudinally to provide fluid flow communication between the interior chamber 316 of the third manifold 304 and the lower chamber 216-1 of the second manifold 204, while the communication ports 322 may be positioned longitudinally to provide fluid flow communication between the upper chamber 216-2 of the second manifold 204 and the interior chamber 116 of the first manifold 104. The heat exchange tubes 106, 206 and 306, which open into the interior chambers 116, 216 (216-1, 216-2) and 316, respectively, extend into the page in the FIG. 6 sectioned view of the triple barrel header. The number and size of the communication ports 322 and 324 can be different and highly depend on the amount of vapor and liquid in the two-phase refrigerant mixture to maintain the desired refrigerant flow distribution and appropriate pressure differential.

As discussed hereinbefore with respect to forming the fluid communication ports 230 in the dual barrel manifold assembly 220 as illustrated in FIGS. 4A-4D, each access port 326, 328 and corresponding aligned fluid communication port 322, 324 may be formed in a continuous operation using a single hole forming tool, or each access port 326, 328 and corresponding aligned fluid communication port 322, 324, may be formed using a two-step operation wherein the access port 326, 328 is formed with a first hole forming tool and then a second hole forming tool is inserted through the access port 326, 328 for forming the fluid communication port 322, 324. Further, as discussed hereinbefore with respect to forming the fluid communication ports 230 in the dual barrel manifold assembly 220 as illustrated in FIGS. 4A-4D, each access port 326, 328 and corresponding aligned fluid communication port 322, 324 may be formed by a drilling operation using a drill as the hole formation tool or by a punching operation using a hole punch as the hole formation tool.

Figure 5D:
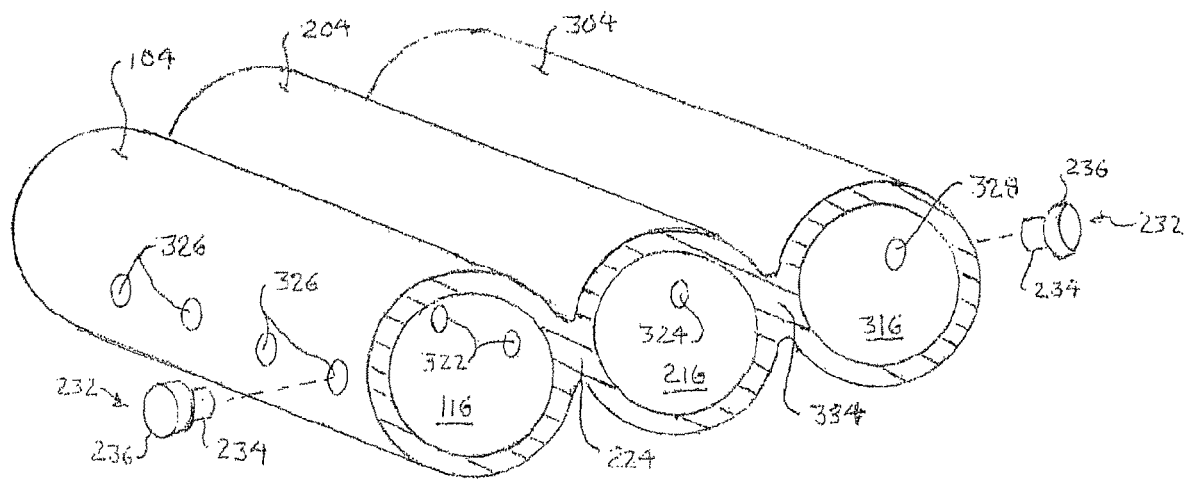

The method further includes sealingly plugging each of the access ports 326, 328 in the same manner as discussed hereinbefore with respect to the dual barrel manifold assembly, as illustrated in FIG. 5D. As illustrated in FIG. 5D, to sealingly plug an access port 326, 328, a plug 232 is inserted into the access port 326, 328 in a force fit and subsequently metallurgically bonded to the surrounding manifold wall during the brazing of the heat exchanger assembly in a brazing furnace, for example a controlled atmosphere furnace.

In an embodiment of the method disclosed herein, the communication ports 230, 322, 324 may be formed with a diameter sized such that the ratio of the manifold internal diameter to the communication port diameter has a value in the range from 3 to 13, inclusive, and the longitudinal spacing between adjacent communication ports connecting adjacent manifolds may be selected such that the ratio of communication port spacing to the manifold internal diameter has a value in the range from 0.5 to 4, inclusive, and such that the ratio of communication port spacing to communication port diameter has a value in the range from 5 to 25, inclusive.

Forming fluid flow passages between adjacent manifolds of an integral manifold assembly having multiple manifolds in accordance with the method disclosed herein eliminates the need for the U-bends or interconnecting piping linking manifolds as typically needed in conventional multiple manifold assemblies for establishing fluid communication between manifolds. Therefore, the higher cost, the higher corrosion risk and the higher leakage risk associated with U-bends or interconnecting piping linking manifolds, as well as the labor of hand brazing typically associated therewith, may be avoided through use of the method disclosed herein.

While the present invention has been particularly shown and described with reference to the exemplary embodiments as illustrated in the drawing, it will be recognized by those skilled in the art that various modifications may be made without departing from the spirit and scope of the invention. Therefore, it is intended that the present disclosure not be limited to the particular embodiment(s) disclosed as, but that the disclosure will include all embodiments falling within the scope of the appended claims.

We claim:

1. A method for manufacturing a manifold assembly with internal fluid communication between a first manifold defining a first fluid chamber and a second manifold defining a second fluid chamber of said manifold assembly, the first manifold and the second manifold joined in parallel relationship along a longitudinally extending interface between a wall of the first manifold and a wall of the second manifold, said method comprising:
   forming a first access port in a wall of one of the first manifold and the second manifold diametrically opposite the interface;
   forming a first fluid communication port extending through a wall of the first manifold and a wall of the second manifold at the interface, said first fluid communication port defining a first fluid passage between the first and second fluid chambers; and
   sealingly plugging the access port;
   wherein each of the first and second manifolds has an internal diameter and the first fluid communication port has a diameter sized such that a ratio of the manifold internal diameter to the communication port diameter has a value in the range from 3 to 13 for each of the first and the second manifolds.

2. The method as set forth in claim 1 wherein sealingly plugging the access port comprises inserting a plug in the access port in a force fit relationship with the manifold in which the access port is formed and brazing the inserted plug to the manifold in which the access port is formed.

3. The method as set forth in claim 2 wherein the inserted plug comprises an end cap and a shaft extending from the end cap into the access port and the end cap abutting an external surface of the manifold in which the access port is formed.

4. The method as set forth in claim 3 further comprising brazing the end cap to the external surface of the manifold in which the access port is formed.

5. The method as set forth in claim 1 further comprising:
forming at least one additional access port spaced longitudinally from the first access port;
forming at least one additional fluid communication port extending through a wall of the first manifold and a wall of the second manifold at the interface, said at least one additional fluid communication port defining an additional fluid passage between the first and second fluid chambers spaced longitudinally from the first fluid passage; and
sealingly plugging the at least one additional access port.

6. The method as set forth in claim 1 wherein at least one of the first access port and the first fluid communication port is non-circular.

7. A manifold assembly manufactured in accordance with the method set forth in claim 1.

8. The method as set forth in claim 1 further comprising forming said manifold assembly as an integral manifold assembly by an extrusion process.

9. The method as set forth in claim 1 wherein forming the access port and the fluid communication port comprises forming the access port and fluid communication port by a drilling operation.

10. The method as set forth in claim 1 wherein forming the access port and the fluid communication port comprises first forming the access port by a first drilling operation and thereafter forming the fluid communication port by a second drilling operation.

11. The method as set forth in claim 1 wherein forming the access port and the fluid communication port comprises first forming the access port by a punching operation and thereafter forming the fluid communication port by a drilling operation.

12. The method as set forth in claim 1 wherein forming the access port and the fluid communication port comprises first forming the access port by a first punching operation and thereafter forming the fluid communication port by a second punching operation.

13. A method for manufacturing a manifold assembly with internal fluid communication between a first manifold defining a first fluid chamber and a second manifold defining a second fluid chamber of said manifold assembly and between a third manifold defining a third fluid chamber and the second fluid chamber, said method comprising:
forming said manifold assembly with the first manifold and the second manifold joined in parallel relationship along a first longitudinally extending interface between a wall of the first manifold and a wall of the second manifold and with the second manifold and the third manifold joined in parallel relationship along a second longitudinally extending interface between a wall of the second manifold and a wall of the third manifold;
forming a first access port in a wall of the first manifold diametrically opposite the first interface between the first manifold and the second manifold and the second interface between the second manifold and the third manifold;
forming a first fluid communication port extending through the wall of the first manifold and the wall of the second manifold at the first interface, the first fluid communication port defining a fluid flow passage between the first and second fluid chambers;
forming a second access port in a wall of the third manifold diametrically opposite the second interface between the second manifold and the third manifold;
forming a second fluid communication port extending through the wall of the third manifold and the wall of the second manifold at the second interface, the second fluid communication port defining a fluid flow passage between the second and third fluid chambers; and
sealingly plugging each of the first access port formed in the first manifold and the second access port formed in the third manifold.

14. The method as set forth in claim 13 wherein forming said manifold assembly includes forming the manifold assembly by an extrusion process as an integral manifold assembly.

15. The method as set forth in claim 13 wherein the second manifold is divided into a first interior chamber and a second interior chamber, the first fluid communication port forms a fluid flow passage connecting between an interior chamber of the first manifold and the first interior chamber of the second manifold and the second communication port forms a fluid flow passage connecting between an interior chamber of the third manifold and the second interior chamber of the second manifold.

16. The method as set forth in claim 13 wherein at least one of the first access port and the first fluid communication port is non-circular.

17. A manifold assembly manufactured in accordance with the method set forth in claim 13.

18. A method for manufacturing a manifold assembly with internal fluid communication between a first manifold defining a first fluid chamber and a second manifold defining a second fluid chamber of said manifold assembly, the first manifold and the second manifold joined in parallel relationship along a longitudinally extending interface between a wall of the first manifold and a wall of the second manifold, said method comprising:
forming a first access port in a wall of one of the first manifold and the second manifold diametrically opposite the interface;
forming a first fluid communication port extending through a wall of the first manifold and a wall of the second manifold at the interface, said first fluid communication port defining a first fluid passage between the first and second fluid chambers; and
sealingly plugging the access port;
forming a second access port in a wall of one of the first manifold and the second manifold diametrically opposite the interface;
forming a second fluid communication port extending through the wall of the first manifold and the wall of the second manifold at the interface, said second fluid communication port defining a second fluid passage between the first and second fluid chambers; and
sealingly plugging the second access port;
wherein each of the first and second manifolds has an internal diameter and a longitudinal spacing between adjacent communication ports connecting the first and second manifolds is selected such that the ratio of communication port spacing between the first fluid communication port and the second fluid communication port to the manifold internal diameter has a value in the range from 0.5 to 4 for each of the first and second manifolds.

19. The method as set forth in claim 18 wherein a ratio of the communication port spacing to the communication port diameter has a value in the range from 5 to 25.

* * * * *